(12) United States Patent
Nakura

(10) Patent No.: US 6,537,702 B2
(45) Date of Patent: Mar. 25, 2003

(54) LITHIUM SECONDARY BATTERY

(75) Inventor: Kensuke Nakura, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 119 days.

(21) Appl. No.: 09/893,895

(22) Filed: Jun. 29, 2001

(65) Prior Publication Data
US 2002/0015890 A1 Feb. 7, 2002

(30) Foreign Application Priority Data

Jun. 30, 2000 (JP) ........................................ 2000-198299
May 16, 2001 (JP) ........................................ 2001-146741

(51) Int. Cl.[7] ................................................ H01M 4/58
(52) U.S. Cl. .............................. 429/231.95; 429/218.1; 429/220; 429/221; 429/223; 429/224; 429/225; 429/231.5
(58) Field of Search .................... 429/231.95, 218.1, 429/220, 221, 223, 224, 225, 231.5

(56) References Cited

U.S. PATENT DOCUMENTS 5,589,298 A * 12/1996 Takada et al. ............... 429/220
6,242,132 B1 * 6/2001 Neudecker et al. ......... 429/218.1

FOREIGN PATENT DOCUMENTS

| EP | 2318127 | 4/1998 |
|---|---|---|
| JP | 06036799 | 2/1994 |
| JP | 06290782 | 10/1994 |
| JP | 09-035714 | 2/1997 |
| JP | 11-086854 | 3/1999 |
| JP | 2000-012090 | 1/2000 |

* cited by examiner

Primary Examiner—Laura Weiner
(74) Attorney, Agent, or Firm—McDermott, Will & Emery

(57) ABSTRACT

A lithium secondary battery having a higher energy density and a longer cycle life than conventional batteries is disclosed, which comprises a positive electrode capable of absorbing and desorbing lithium, a non-aqueous electrolyte and a negative electrode capable of absorbing and desorbing lithium, wherein the negative electrode comprises a nitride represented by the general formula: $Li_xA_yMe_zN$, where A is boron, silicon or aluminum, Me is at least one element selected from the group consisting of transition metal elements and metal elements of Group IIIB, IVB and VB, and x, y and z satisfy $0<x<3$, $0<y\leqq1$, $0<z\leqq1$ and $0<x+y+z\leqq3$.

2 Claims, 1 Drawing Sheet

LITHIUM SECONDARY BATTERY

BACKGROUND OF THE INVENTION

In recent years, lithium secondary batteries, which have a higher discharge voltage and a higher energy density than conventional small aqueous secondary batteries, have been put into practical use as the main power sources for portable appliances. When lithium metal is used as a negative electrode active material, a lithium secondary battery having a high energy density can be obtained because lithium metal has a high electrochemical capacity per weight.

However, during charging of the battery having lithium metal in the negative electrode, dendrite deposits on the surface of the lithium metal, which grows during repeated charge/discharge cycles. When the grown dendrite comes into contact with the positive electrode, a short circuit occurs inside the battery.

Moreover, the dendrite is highly reactive because of its large surface area, so that it reacts with an organic solvent in the electrolyte. Consequently, a coating film having a low electronic conductivity, which is made of decomposition products of the solvent, is formed on the surface of the dendrite, thereby increasing the internal resistance of the battery.

Further, on the surface of the negative electrode, the grown dendrite often causes lithium particles isolated from the conductive network, thereby decreasing the charge/discharge efficiency of the battery.

Therefore, a lithium secondary battery using lithium metal as a negative electrode active material has problems of a low reliability and a short cycle life.

The materials that are currently studied as negative electrode active materials alternative to lithium metal include: a carbon material capable of absorbing and desorbing lithium; a lithium-containing metal oxide such as $Nb_2O_5$ or $Li(Li_{1/3}Ti_{5/3})O_4$ (Japanese Laid-Open Patent Publication No. 2000-12090); a lithium-containing metal nitride such as $Li_7MnN_4$, $Li_3FeN_2$ or $Li_{2.4}Co_{0.6}N$ (Japanese Laid-Open Patent Publication No. hei 9-35714); and an intermetallic compound, a solid solution or an oxide each containing Si, Sn or the like as a constituent element (Japanese Laid-Open Patent Publication No. hei 11-86854).

When a carbon material is used in the negative electrode, the charge reaction is the absorption reaction of Li ion into the carbon material. Accordingly, the deposition of lithium does not occur and, therefore, problems due to the dendrite do not occur. Similarly, when an intermetallic compound, a solid solution or an oxide each containing Si, Sn or the like as a constituting element and having a discharge capacity of approximately 2000 mAh/g is used, the formation of the dendrite does not occur.

Among practically used carbon materials, the theoretical capacity of, for example, graphite is 372 mAh/g. This is only about 10% of the theoretical capacity of lithium metal. Additionally, the capacity of a lithium-containing metal oxide such as $Nb_2O_5$ or $Li(Li_{1/3}Ti_{5/3})O_4$ is 100 to 200 mAh/g, which is even smaller than those of carbon materials.

The capacity of a lithium-containing metal nitride such as $Li_{2.4}Co_{0.6}N$ is approximately 760 mAh/g. Therefore, a battery using the lithium-containing metal nitride in the negative electrode has a higher energy density than the one using a carbon material or a lithium-containing metal oxide. However, the lithium-containing metal nitride is inferior to conventional carbon materials in terms of the cycle characteristics of the battery.

Similarly, a battery which uses in the negative electrode an intermetallic compound, a solid solution or an oxide each containing Si, Sn or the like as a constituting element has a problem of a short cycle life. This problem is attributable to the fact that the redox reaction of the battery comprises the reaction wherein an alloy of lithium and the negative electrode active material is formed, and the reaction wherein Li is desorbed from the alloy, so that the rate of the expansion and contraction of the negative electrode active material during charging and discharging is high. Accordingly, during the repetition of the charge/discharge cycle, the negative electrode active material is pulverized owing to the internal stress, thereby destructing the conductive network.

BRIEF SUMMARY OF THE INVENTION

The purpose of the present invention is to solve the above-discussed problem and to provide a lithium secondary battery having a high energy density and a long cycle life, and more specifically, to provide a negative electrode active material used therein.

The present invention relates to a lithium secondary battery comprising a positive electrode capable of absorbing and desorbing lithium, a non-aqueous electrolyte and a negative electrode capable of absorbing and desorbing lithium, wherein the negative electrode comprises a nitride represented by the general formula: $Li_xA_yMe_zN$, where A is boron, silicon or aluminum, Me is at least one element selected from the group consisting of transition metal elements and metal elements of Group IIIB, IVB and VB, and x, y and z satisfy $0<x<3$, $0<y\leq1$, $0<z\leq1$ and $0<x+y+z\leq3$.

The Me is preferably at least one element selected from the group consisting of Ti, V, Cr, Mn, Fe, Co, Ni, Cu, Zr, Nb, Mo, Ru, Sn, W, Pb and Bi.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
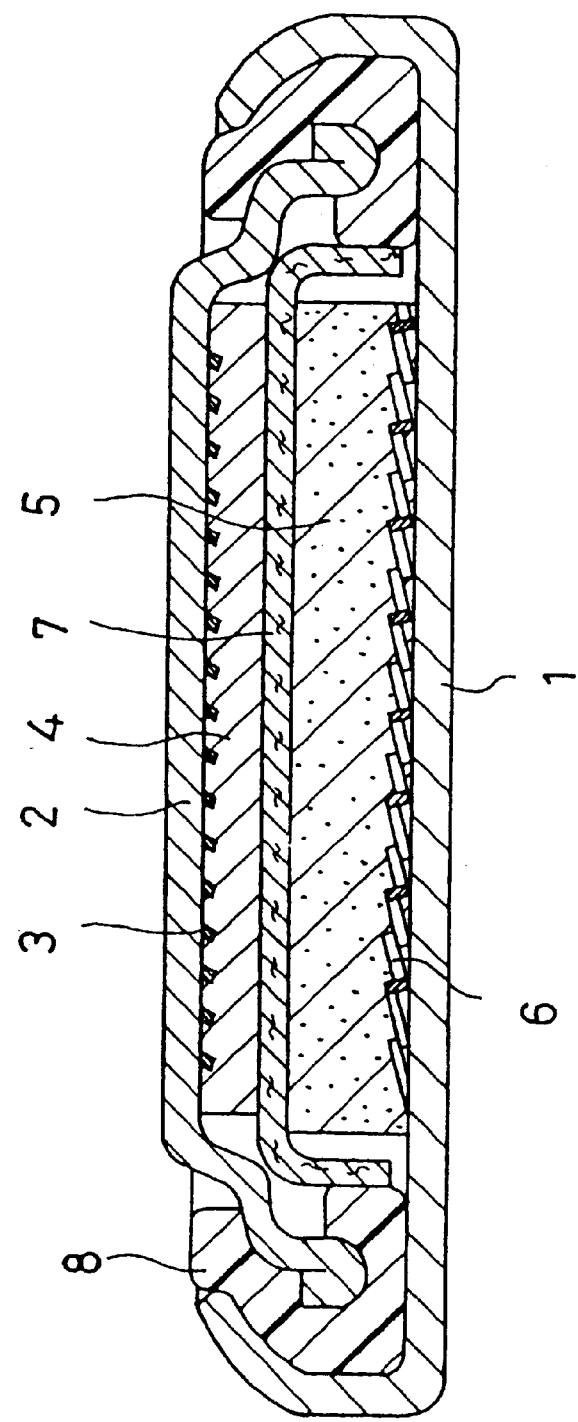
FIG. 1 is a longitudinal sectional view of a coin type test cell of the present invention.

A nitride represented by the general formula: $Li_xA_yMe_zN$, which is used in the present invention, is a solid solution wherein the Me which causes a redox reaction is contained in a crystal of a lithium ion conductor represented by the general formula: $Li_xA_yN$ where $0<x<3$ and $0<y\leq1$. Here, the Me gives an electronic conductivity to the lithium ion conductor.

Examples of the lithium ion conductor represented by $Li_xA_yN$, where $0<x<3$ and $0<y\leq1$, include $Li_3BN_2$, $Li_8SiN_4$ and $LiAlN_2$.

It is considered that the redox reaction in the battery, in which the nitride represented by $Li_xA_yMe_zN$ participates, is the absorption/desorption reaction of Li into and from the nitride. Thus, neither the formation of the dendrite nor the pulverization due to the alloy formation is expected to occur.

In an experiment to measure the capacity maintenance rate of a battery having a negative electrode which comprises one or more of various nitrides represented by $Li_xA_yMe_zN$, a capacity maintenance rate of not less than 94% was obtained at 30th charge/discharge cycle. It is considered that such a high capacity maintenance rate can be achieved not only because the redox reaction in which the nitride participates is the absorption/desorption reaction of Li into and from the nitride, but also because the rate of the expansion or construction of the nitride due to the charge/discharge reaction is low. The rate of the expansion or construction of the nitride is approximately +3% to −3% on the basis of the volume of the electrode plate before charging or discharging.

The Me contained in the nitride represented by $Li_xA_yMe_zN$ is preferably at least one element selected from the group consisting of Ti, V, Cr, Mn, Fe, Co, Ni, Cu, Zr, Nb, Mo, Ru, Sn, W, Pb and Bi. By using these elements as Me, the potential of the nitride becomes approximately 0.8 V versus that of lithium, and a battery having a high capacity and a long cycle life can be obtained.

As in the case of $Li_{3-x}Co_xN$, the nitride represented by $Li_xA_yMe_zN$ has a capacity much greater than the capacity thereof estimated supposing that only Me participates in the redox reaction. Although the reason for this is unclear, it is presumably because nitrogen, as well as Me, participates in the redox reaction, as in the case of $Li_{3-x}Me_xN$.

Among the lithium-containing metal nitrides, $Li_{2.6}Co_{0.4}N$, $Li_{2.6}Cu_{0.4}N$ and the like have particularly high reversible capacities. However, the reversible capacities cannot be fully utilized. A battery containing $Li_{2.6}Co_{0.4}N$, $Li_{2.6}Cu_{0.4}N$ or the like in the negative electrode rapidly deteriorates in cycle characteristics unless the charging and discharging is limited to a certain degree. The reason is that the electrochemical oxidation reaction of the nitride proceeds during charge/discharge cycles, thereby generating a nitrogen gas. The generation of a nitrogen gas destabilizes and finally destructs the structure of $Li_{2.6}Co_{0.4}N$, $Li_{2.6}Cu_{0.4}N$ or the like. Consequently, the redox reaction cannot occur reversibly.

On the other hand, the reversible capacity of $Li_xA_yMe_zN$ can be fully utilized. Although the reason for this is also unclear, this is presumably because the nitrogen in $Li_xA_yMe_zN$ is relatively stable even when it is oxidized, so that the structure of $Li_xA_yMe_zN$ can be maintained. Therefore, a battery fabricated by using $Li_xA_yMe_zN$ has a higher capacity and a longer cycle life than the one fabricated by using $Li_{3-x}Co_xN$, $Li_{3-x}Cu_xN$ or the like.

For the reasons set forth above, a lithium secondary battery having a high energy density and a long cycle life can be obtained by the use of $Li_xA_yMe_zN$ as a negative electrode active material.

In the following, one example of the method of synthesizing $Li_xA_yMe_zN$ will be described.

Nitrides or metals of the constituting elements of $Li_xA_yMe_zN$ are mixed at a predetermined ratio, and the obtained mixture is heated under the following conditions. When x, y and z satisfy $0<x<3$, $0<y\leq 1$ and $0<z\leq 1$, single phase or amorphous $Li_xA_yMe_zN$ containing no impurity can be obtained.

The temperature for heating the starting materials is preferably 400 to 1800° C. At a temperature lower than 400° C., the heating must be conducted for long hours in order to obtain a desired product since the reaction speed is slow. On the other hand, at a temperature higher than 1800° C., the product tends to contain impurities.

The heating of the starting materials is conducted in a nitrogen, argon or helium gas atmosphere. The atmosphere may be set according to the kind of the starting materials to be used. When starting materials containing no nitrogen such as metals are used, a nitrogen gas atmosphere is necessary. When starting materials containing sufficient nitrogen such as nitrides are used, a nitrogen gas atmosphere is not necessary. In this case, an argon or helium gas atmosphere may be used. The partial pressure of the nitrogen gas in the atmosphere is also adjusted according to the kind of the starting materials to be used. As a gas to be used for adjusting the partial pressure of the nitrogen gas, helium, argon, hydrogen or the like may be used.

The negative electrode may be fabricated by preparing an electrode mixture of a negative electrode active material comprising the above nitride, a conductive agent, a binder and the like, and applying the obtained mixture onto the surface of a current collector. The positive electrode may be fabricated by preparing an electrode mixture of a positive electrode material capable of electrochemically and reversibly absorbing and desorbing lithium, a conductive agent, a binder and the like, and applying the obtained mixture onto the surface of a current collector.

As a conductive agent in the negative electrode, for example, a graphite such as a natural graphite including flake graphite, an artificial graphite or expanded graphite; a carbon black such as acetylene black, ketchen black, channel black, furnace black, lamp black or thermal black; a conductive fiber such as a carbon fiber and a metal fiber; a metal powder such as a copper powder or a nickel powder; and a conductive organic material such as a polyphenylene derivative may be used. These may be used singly or in a mixture of two or more of them. Particularly, an artificial graphite, acetylene black and a carbon fiber are preferred.

The amount of the conductive agent is preferably 1 to 50 parts by weight, and more preferably 1 to 30 parts by weight per 100 parts by weight of the negative electrode active material. Here, the above nitride has an electronic conductivity and, therefore, it is not always necessary to add a conductive agent thereto.

Examples of a binder in the negative electrode include, polyethylene, polypropylene, polytetrafluoroethylene, polyvinylidene fluoride, styrene butadiene rubber, a tetrafluoroethylene-hexafluoroethylene copolymer, a tetrafluoroethylene-hexafluoropropylene copolymer, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or a cross-linked copolymer by Na ions thereof, an ethylene-methacrylic acid copolymer or a cross-linked copolymer by Na ions thereof, an ethylene-methyl acrylate copolymer or a cross-linked copolymer by Na ions thereof, or an ethylene-methyl methacrylate copolymer or a cross-linked copolymer by Na ions thereof. They may be used singly or in a mixture of two or more of them. Preferred among them are styrene butadiene rubber, polyvinylidene fluoride, an ethylene-acrylic acid copolymer or a cross-linked copolymer by Na ions thereof, an ethylene-methacrylic acid copolymer or a cross-linked copolymer by Na ions thereof, an ethylene-methyl acrylate copolymer or a cross-linked copolymer by Na ions thereof, an ethylene-methyl methacrylate copolymer or a cross-linked copolymer by Na ion thereof.

As a current collector in the negative electrode, for example, the one made of stainless steel, nickel, copper, a copper alloy, titanium, carbon or a conductive polymer may be used. Particularly, copper and a copper alloy are preferred. The surface of the current collector made of the above material may be coated with carbon, nickel or titanium, or it may be oxidized. Also, asperities may be formed on the surface of the current collector. The current collector may be in the form of a foil, film, sheet, net, punched sheet, lath sheet, porous sheet, foamed sheet, nonwoven fabric or the like. The thickness of the current collector is preferably 1 to 500 $\mu$m.

As a positive electrode material, a lithium-containing transition metal oxide may be used. For example, $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, where M is at least one element selected from the group consisting of Na, Mg, Sc, Y, Mn, Fe, Co, Ni, Cu, Zn, Al, Cr, Pb, Sb and B, may be used. Here, x, y and z satisfy $0 \leq x \leq 1.2$, $0 \leq y \leq 0.9$ and $2.0 \leq z \leq 2.3$. The value of x is a value before the start of charging and discharging, which increases or decreases during charging and discharging.

A transition metal chalcogenide; a vanadium oxide and a lithium compound thereof; a niobium oxide and a lithium compound thereof; a conjugated polymer comprising an organic conductive material; a Chevrel phase compound or the like may also be used as the positive electrode material.

A mixture of two or more of different positive electrode materials may also be used.

The average particle size of the positive electrode material is preferably 1 to 30 $\mu$m.

Examples of a conductive agent in the positive electrode include a graphite such as a natural graphite including flake graphite or an artificial graphite; a carbon black such as acetylene black, ketchen black, channel black, furnace black, lamp black or thermal black; a conductive fiber such as a carbon fiber or a metal fiber; carbon fluoride; a metal powder such as an aluminum powder; a conductive whisker such as zinc oxide or potassium titanate; a conductive metal oxide such as titanium oxide; a conductive organic material such as a polyphenylene derivative or the like may be used. They may be used singly or in a mixture of two or more of them. Particularly, an artificial graphite and acetylene black are preferred.

The amount of the conductive agent in the positive electrode is preferably 1 to 50 parts by weight, and more preferably 1 to 30 parts by weight per 100 parts by weight of the positive electrode active material. Particularly, the amount of the carbon material is preferably 2 to 15 parts by weight per 100 parts by weight of the positive electrode active material.

Examples of a binder in the positive electrode include, polyethylene, polypropylene, polytetrafluoroethylene, polyvinylidene fluoride, a styrene butadiene rubber, a tetrafluoroethylene-hexafluoroethylene copolymer, a tetrafluoroethylene-hexafluoropropylene copolymer, a tetrafluoroethylene-perfluoroalkyl vinyl ether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethyl vinyl ether-tetrafluoroethylene copolymer, an ethylene-acrylic acid copolymer or a cross-linked copolymer by Na ions thereof, an ethylene-methacrylic acid copolymer or a cross-linked copolymer by Na ions thereof, an ethylene-methyl acrylate copolymer or a cross-linked copolymer by Na ions thereof, an ethylene-methyl methacrylate copolymer or a cross-linked copolymer by Na ions thereof. They may be used singly or in a mixture of two or more of them. Particularly, polyvinylidene fluoride and polytetrafluoroethylene are preferred.

As a current collector in the positive electrode, for instance, the one made of stainless steel, aluminum, an aluminum alloy, titanium, carbon or a conductive polymer may be used. Particularly, aluminum and an aluminum alloy are preferred. The surface of the current collector made of the above material may be coated with carbon or titanium, or it may be oxidized. Also, asperities may be formed on the surface of the current collector. The current collector may be in the form of a foil, film, sheet, net, punched sheet, lath sheet, porous sheet, foamed sheet, nonwoven fabric or the like. The thickness of the current collector is preferably 1 to 500 $\mu$m.

The electrode mixture may contain a filler, a dispersing medium, an ionic conductor and other additives, in addition to the conductive agent and the binder. As a filler, a fibriform material, which does not chemically change in an assembled battery, is preferably used. Generally, an olefin type polymer, such as polypropylene or polyethylene, a glass fiber or a carbon fiber is preferably used. The filler content in the electrode mixture is preferably 0 to 30 wt %.

The non-aqueous electrolyte comprises a non-aqueous solvent and a lithium salt dissolved therein.

Examples of the non-aqueous solvent include a cyclic carbonate such as ethylene carbonate, propylene carbonate, butylene carbonate or vinylene carbonate; a non-cyclic carbonate such as dimethyl carbonate, diethyl carbonate, ethyl methyl carbonate or dipropyl carbonate; an aliphatic carboxylic acid ester such as methyl formate, methyl acetate, methyl propionate or ethyl propionate; a $\gamma$-lactone such as $\gamma$-butyrolactone; a non-cyclic ether such as 1,2-dimethoxyethane, 1,2-diethoxyethane or ethoxymethoxyethane; a cyclic ether such as tetrahydrofuran or 2-methyltetrahydrofuran; an organic aprotic solvent such as dimethylsulfoxide, 1,3-dioxolane, formamide, acetamide, dimethylformamide, dioxolane, acetonitrile, propylnitrile, nitromethane, ethyl monoglyme, phospheric acid triester, trimethoxymethane, a dioxolane derivative, sulfolane, methylsulfolane, 1,3-dimethyl-2-imidazolidinone, 3-methyl-2-oxazolidinone, a propylene carbonate derivative, a tetrahydrofuran derivative, ethyl ether, 1,3-propanesultone, anisole, dimethylsulfoxide and N-methylpyrrolidone. They may be used singly or in a mixture of two or more of them. Particularly, the mixture of a cyclic carbonate and a non-cyclic carbonate or the mixture of a cyclic carbonate, a non-cyclic carbonate and an aliphatic carboxylic acid ester are preferred.

As a lithium salt, for example, $LiClO_4$, $LiBF_4$, $LiPF_6$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, a lithium lower aliphatic carboxylate, $LiCl$, $LiBr$, $LiI$, chloroboran lithium, lithium tetraphenylborate, imides or the like may be used. They may be used singly or in a mixture of two or more of them. It is preferred for the electrolyte to contain at least $LiPF_6$.

A particularly preferred non-aqueous electrolyte is the one prepared by dissolving $LiPF_6$ in a mixed solvent containing ethylene carbonate and ethyl methyl carbonate. The concentration of $LiPF_6$ in the non-aqueous electrolyte is preferably 0.2 to 2 mol/liter, and more preferably 0.5 to 1.5 mol/liter.

The amount of the non-aqueous electrolyte to be contained in a battery varies depending on the amounts of the positive electrode material or the negative electrode material, the size of the battery or the like.

The following solid electrolyte may also be used. The solid electrolytes are classified into an inorganic solid electrolyte and an organic solid electrolyte.

Examples of the inorganic solid electrolyte are a nitride of Li, a halide of Li, a Li salt of oxyacid and the like. Among them, $Li_4SiO_4$, $Li_4SiO_4$-LiI-LiOH, $xLi_3PO_4$-$(1-x)Li_4SiO_4$, $Li_2SiS_3$, $Li_3PO_4$-$Li_2S$-$SiS_2$ and phosphorus sulfides are preferred.

Examples of the organic solid electrolyte include polyethylene oxide, polypropylene oxide, polyphosphazene, polyaziridine, polyethylene sulfide, polyvinyl alcohol, polyvinylidene fluoride, polyhexafluoropropylene, and derivatives, mixtures or complexes thereof.

Additionally, it is effective to add other compounds to the electrolyte in order to improve the discharge capacity and charge/discharge characteristics. For example, triethyl phosphate, triethanolamine, a cyclic ether, ethylenediamine, n-glyme, pyridine, a hexaphosphoric acid triamide, a nitrobenzene derivative, a crown ether, a quaternary ammonium salt, an ethylene glycol dialkyl ether or the like may be added to the electrolyte.

As a separator, an insulating microporous thin film having a high ionic permeability and a predetermined mechanical strength may be used. It is preferred to give the separator the capability to increase the resistance by closing its pores in a high temperature range. In terms of the resistance to an organic solvent and the hydrophobic property, it is preferred to use a sheet, a nonwoven fabric or a woven fabric each made of an olefin type polymer such as polypropylene or polyethylene, a glass fiber or the like. The pore size of the separator is preferably small enough to prevent the positive electrode material, negative electrode material, binder and conductive agent from passing therethrough, each of which is released from the electrode plate. The pore size may be, for example, 0.01 to 1 $\mu$m. Generally, the thickness of the separator is 10 to 300 $\mu$m and the porosity thereof is 30 to 80%.

The positive electrode mixture and negative electrode mixture may contain a polymer material, in which a non-aqueous electrolyte comprising a non-aqueous solvent and a lithium salt is absorbed and retained. Additionally, a battery may be configured by integrating the positive electrode and negative electrode, with a porous separator made of a polymer material capable of absorbing and retaining the non-aqueous electrolyte interposed therebetween. Preferred examples of the above polymer material include a copolymer of vinylidene fluoride and hexafluoropropylene.

The present invention is applicable to any type of battery. For example, it is applicable to a battery of coin, button, sheet, laminated, cylindrical, flat or square type.

The lithium secondary battery of the present invention can be used for personal digital assistants, portable electronic appliances, domestic power storage appliances, two-wheeled motor vehicles, electric vehicles, hybrid electric vehicles and the like, although its use is not restricted to these applications.

In the following, the present invention will be specifically described with reference to examples, but it should be understood that the invention is not construed as being limited thereto.

(i) Synthesis of Sample Active Materials

EXAMPLES 1 TO 16

As starting materials, lithium nitride ($Li_3N$); a transition metal selected from V, Mn, and Co; and a nitride selected from boron nitride (BN), silicon nitride ($Si_3N_4$) and aluminum nitride (AlN) were used. The materials were weighed at a predetermined ratio, and mixed sufficiently in an agate mortar. Here, the lithium content in the mixture of the starting materials was adjusted to be 5% greater than that in a target product, since lithium sublimated at high temperatures.

When the obtained mixture was containing BN or AlN, the mixture was wrapped with a copper foil and put in a crucible made of aluminum oxide, which was then placed in a nitrogen atmosphere in an electric furnace. Alternatively, when the obtained mixture was containing $Si_3N_4$, the mixture was put in a crucible made of platinum, which was then placed in a nitrogen atmosphere in an electric furnace. The temperature of the electric furnace was raised from room temperature to 1600° C. and maintained for 12 hours at 1600° C. Subsequently, the mixture was rapidly cooled to give a sample active material.

$Li_3B_{0.5}Mn_{0.5}N_2$, $Li_8Si_{0.5}Mn_{0.5}N_4$, $Li_9B_{0.5}V_{0.5}N_4$, $Li_9Al_{0.5}V_{0.5}N_4$, $Li_9B_{0.5}Co_{0.5}N_4$, $Li_9Al_{0.5}Co_{0.5}N_4$, $Li_{11}Si_{0.5}Mn_{0.5}N_5$, $Li_{18}B_{0.5}V_{0.5}N_7$, $Li_{18}Al_{0.5}V_{0.5}N_7$, $Li_{18}B_{0.5}Co_{0.5}N_7$, $Li_{18}Al_{0.5}Co_{0.5}N_7$, $Li_{20}Si_{0.5}Mn_{0.5}N_8$, $Li_{21}B_{0.5}V_{0.5}N_8$, $Li_{21}Al_{0.5}V_{0.5}N_8$, $Li_{21}B_{0.5}Co_{0.5}N_8$ and $Li_{21}Al_{0.5}Co_{0.5}N_8$ were synthesized in Example 1, Example 2, Example 3, Example 4, Example 5, Example 6, Example 7, Example 8, Example 9, Example 10, Example 11, Example 12, Example 13, Example 14, Example 15 and Example 16, respectively.

Each of the sample active materials obtained in Example 1 to 16 was pulverized in the agate mortar in a nitrogen atmosphere. Subsequently, the pulverized sample active material was examined by X-ray diffraction analysis using a CuKα radiation. The X-ray diffraction pattern confirmed that each sample active material was amorphous phase. After that, test electrodes containing the respective sample active materials were fabricated, followed by assembling test cells including the test electrodes.

Comparative Example 1

A sample active material of $Li_{2.6}Co_{0.4}N$ was synthesized with a conventionally known method shown below.

As starting materials, lithium nitride and metal cobalt were used. The starting materials were weighed such that the atomic ratio of Li in the lithium nitride and Co in the metal cobalt was 2.52:0.60. The weighed materials were then mixed sufficiently in an agate mortar.

The mixture thus obtained was placed in a nitrogen atmosphere in an electric furnace. The temperature of the electric furnace was raised from room temperature to 700° C. and maintained for 12 hours at 700° C. Then, the temperature of the electric furnace was lowered to around room temperature, and then the sample was taken out. The obtained sample active material was pulverized in the agate mortar in a nitrogen atmosphere. Subsequently, the pulverized sample active material was examined by X-ray diffraction analysis using a CuKα radiation. The X-ray diffraction pattern confirmed that the sample was single phase containing no impurity. After that, a test electrode was fabricated using the sample active material, followed by assembling a test cell including the test electrode.

Comparative Example 2

A test electrode containing a graphite capable of absorbing and desorbing lithium as an active material was fabricated, and a test cell including the test electrode was assembled.

(ii) Fabrication of Test Cells

In order to evaluate the electrochemical characteristics of the respective sample active materials, coin-type test cells of R2016 size (diameter 20.0 mm, height 1.6 mm) shown in FIG. 1 were fabricated.

A battery case 1 made of stainless steel and a sealing plate 2 for sealing the opening of the battery case 1 were prepared. A disc-shaped electrode 4 made of lithium metal was attached by pressure to a current collector 3 disposed inside the sealing plate 2.

A test electrode 5 is obtained by molding a mixture of 75 wt % of a predetermined sample active material, 20 wt % of a carbon powder as a conductive agent and 5 wt % of polyvinylidene fluoride as a binder integrally with a current collector 6 comprising expanded metal of stainless steel. The test cell thus obtained was dried sufficiently at 80° C. under reduced pressure.

Subsequently, the current collector 6 included in the test electrode 5 was welded to the inner bottom surface of the battery case 1. A separator 7 made of a microporous polypropylene film was placed on the test electrode 5. Further, an organic electrolyte was injected into the battery case 1 to impregnate the separator 7 and the test electrode therewith. Then, the opening of the battery case 1 was sealed tightly with the sealing plate 2, with a gasket 8 made of polypropylene interposed therebetween.

The above organic electrolyte was prepared by dissolving $LiPF_6$ at a concentration of 1 mol/liter as a solute in a mixed solvent containing ethylene carbonate and diethyl carbonate in equal volumes.

(iii) Evaluation of Test Cells

Evaluations of the test cells of Examples 1 to 16 and Comparative Examples 1 and 2 were carried out as follows.

Each test cell was discharged at a constant current of 0.5 $mA/cm^2$ until the battery voltage reached 1.5V, and then charged until the voltage decreased to 0 V. This charge/discharge cycle was repeated for 30 times in a constant-temperature bath at 20° C. Here, the charge reaction was the absorption reaction of Li by the test electrode, and the discharge reaction was the desorption reaction of Li from the test electrode.

The percentage of the discharge capacity at 30th cycles to the initial discharge capacity was calculated as the capacity maintenance rate.

The initial discharge capacities, the discharge capacities at 30th cycle and the capacity maintenance rates of the cells are shown in Table 1.

TABLE 1

| Sample active material | Initial discharge capacity (mAh/g) | Discharge capacity at 30th cycle (mAh/g) | Capacity maintenance rate (%) |
|---|---|---|---|
| Ex. 1 | $Li_3B_{0.5}Mn_{0.5}N_2$ | 1000 | 940 | 94 |
| Ex. 2 | $Li_8Si_{0.5}Mn_{0.5}N_4$ | 870 | 830 | 95 |
| Ex. 3 | $Li_9B_{0.5}V_{0.5}N_4$ | 890 | 840 | 94 |
| Ex. 4 | $Li_9Al_{0.5}V_{0.5}N_4$ | 850 | 800 | 94 |
| Ex. 5 | $Li_9B_{0.5}Co_{0.5}N_4$ | 840 | 790 | 94 |
| Ex. 6 | $Li_9Al_{0.5}Co_{0.5}N_4$ | 840 | 790 | 94 |
| Ex. 7 | $Li_{11}Si_{0.5}Mn_{0.5}N_5$ | 850 | 810 | 95 |
| Ex. 8 | $Li_{18}B_{0.5}V_{0.5}N_7$ | 840 | 790 | 94 |
| Ex. 9 | $Li_{18}Al_{0.5}V_{0.5}N_7$ | 810 | 760 | 94 |
| Ex. 10 | $Li_{18}B_{0.5}Co_{0.5}N_7$ | 840 | 790 | 94 |
| Ex. 11 | $Li_{18}Al_{0.5}Co_{0.5}N_7$ | 840 | 800 | 95 |
| Ex. 12 | $Li_{20}Si_{0.5}Mn_{0.5}N_8$ | 820 | 780 | 95 |
| Ex. 13 | $Li_{21}B_{0.5}V_{0.5}N_8$ | 830 | 780 | 94 |
| Ex. 14 | $Li_{21}Al_{0.5}V_{0.5}N_8$ | 810 | 770 | 95 |
| Ex. 15 | $Li_{21}B_{0.5}Co_{0.5}N_8$ | 800 | 760 | 95 |
| Ex. 16 | $Li_{21}Al_{0.5}Co_{0.5}N_8$ | 800 | 760 | 95 |
| Com. Ex. 1 | $Li_{2.6}Co_{0.4}N$ | 760 | 680 | 90 |
| Com. Ex. 2 | Graphite | 350 | 320 | 92 |

Table 1 shows that each of the test cells of Examples has a higher discharge capacity than the test cells of the Comparative Examples 1 and 2. Here, each of the test electrodes of the test cells of Examples had a potential as low as approximately 0.8 V.

It is considered that similar results will be obtained for a battery comprising a nitride other than the ones used in the above Examples, which is represented by the general formula: $Li_xA_yMe_zN$, where A is boron, silicon or aluminum, Me is at least one element selected from the group consisting of transition metal elements and metal elements of Group IIIB, IVB and VB, and x, y and z satisfy $0<x<3$, $0<y\leq1$, $0<z\leq1$ and $0<x+y+z\leq3$.

Additionally, Table 1 shows that each of the test cells of Examples has a higher capacity maintenance rate than the test cell of Comparative Example 1 using $Li_{2.6}Co_{0.4}N$. Furthermore, each test cell of examples has a higher capacity maintenance rate than the test cell of Comparative Example 2, which includes a graphite as an active material.

As described above, the present invention provides a lithium secondary battery having a higher energy density and a longer cycle life than conventional batteries.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A lithium secondary battery comprising a positive electrode capable of absorbing and desorbing lithium, a non-aqueous electrolyte and a negative electrode capable of absorbing and desorbing lithium, wherein said negative electrode comprises a nitride represented by the general formula: $Li_xA_yMe_zN$, where A is boron, silicon or aluminum, Me is at least one element selected from the group consisting of transition metal elements and metal elements of Group IIIB, IVB and VB, and x, y and z satisfy $0<x<3$, $0<y\leq1$, $0<z\leq1$ and $0<x+y+z\leq3$.

2. The lithium secondary battery in accordance with claim 1, wherein said Me is at least one element selected from the group consisting of Ti, V, Cr, Mn, Fe, Co, Ni, Cu, Zr, Nb, Mo, Ru, Sn, W, Pb and Bi.

* * * * *